(12) United States Patent
Nallet et al.

(10) Patent No.: US 12,709,219 B2
(45) Date of Patent: Aug. 18, 2026

(54) EXTERIOR LIGHTING SYSTEM FOR A VEHICLE

(71) Applicant: Volvo Truck Corporation, Gothenburg (SE)

(72) Inventors: Sebastien Nallet, Venerieu (FR); Raphael Ribero, Millery (FR)

(73) Assignee: Volvo Truck Corporation, Gothenburg (SE)

( * ) Notice: Subject to any disclaimer, the term of this patent is extended or adjusted under 35 U.S.C. 154(b) by 36 days.

(21) Appl. No.: 18/947,473

(22) Filed: Nov. 14, 2024

(65) Prior Publication Data

US 2025/0162496 A1 May 22, 2025

(30) Foreign Application Priority Data

Nov. 21, 2023 (EP) .................................... 23211245

(51) Int. Cl.

| | |
|---|---|
| ***B60Q 1/48*** | (2006.01) |
| ***F21S 41/37*** | (2018.01) |
| ***F21S 41/686*** | (2018.01) |
| ***F21S 43/00*** | (2018.01) |
| ***F21S 43/33*** | (2018.01) |

(52) U.S. Cl.
CPC .............. *B60Q 1/486* (2013.01); *F21S 41/37* (2018.01); *F21S 41/686* (2018.01); *F21S 43/33* (2018.01); *F21S 43/601* (2024.05)

(58) Field of Classification Search
CPC ...... B60Q 1/2665; B60Q 3/258; B60Q 1/247; B60Q 2400/40; B60Q 1/543; B60Q 1/50; B60Q 1/0023; B60Q 1/22; B60Q 1/507; B60Q 1/54; B60Q 1/5037; B60Q 1/525
See application file for complete search history.

(56) References Cited

U.S. PATENT DOCUMENTS

| | | | |
|---|---|---|---|
| 9,956,903 | B2 | 5/2018 | Gondhi et al. |
| 11,614,214 | B2 | 3/2023 | Walter et al. |
| 2005/0180154 | A1 | 8/2005 | Albou et al. |

(Continued)

FOREIGN PATENT DOCUMENTS

| | | | |
|---|---|---|---|
| DE | 10034379 | C2 | 12/2002 |
| DE | 102005033722 | A1 | 1/2007 |

(Continued)

OTHER PUBLICATIONS

European Search Report for European Patent Application No. 23211245.8, completed May 10, 2024, 3 pages.

*Primary Examiner* — Wei (Victor) Y Chan
(74) *Attorney, Agent, or Firm* — Withrow & Terranova, PLLC

(57) ABSTRACT

An exterior lighting system for a vehicle comprising a lighting source configured to emit a light beam, the lighting source being part of one of existing exterior lights of the vehicle, an object being configured to have at least one active position and a passive position, the object being configured to modify the light beam in the at least one active position and to have no effect on the light beam in the passive position, an actuator configured to move the object between the at least one active position and the passive position, and a controller for controlling the actuator, the controller being configured to deactivate the actuator when the vehicle is not parked and activate the actuator only when the vehicle is parked.

11 Claims, 5 Drawing Sheets

(56) References Cited

U.S. PATENT DOCUMENTS

| | | | | |
|---|---|---|---|---|
| 2019/0255988 | A1* | 8/2019 | Frederick | B60Q 1/085 |
| 2023/0077175 | A1* | 3/2023 | Ajay Kumar | B60Q 1/2603 |

FOREIGN PATENT DOCUMENTS

| | | | |
|---|---|---|---|
| DE | 102012020414 | A1 | 4/2014 |
| DE | 102019111480 | A1 | 11/2020 |
| DE | 102016218584 | B4 | 7/2022 |
| EP | 0794382 | A2 | 9/1997 |
| EP | 4275956 | A1 | 11/2023 |
| FR | 2845330 | A1 | 4/2004 |
| KR | 101094228 | B1 | 12/2011 |
| RU | 2660109 | C2 | 7/2018 |

* cited by examiner

EXTERIOR LIGHTING SYSTEM FOR A VEHICLE

PRIORITY APPLICATIONS

The present application claims priority to European Patent Application No. 23211245.8, filed on Nov. 21, 2023, and entitled "EXTERIOR LIGHTING SYSTEM FOR A VEHICLE," which is incorporated herein by reference in its entirety.

TECHNICAL FIELD

The disclosure relates generally to activities around a vehicle when the vehicle is parked. In particular aspects, the disclosure relates to an exterior lighting system for a vehicle, a vehicle comprising such an exterior lighting system and a method for controlling such an exterior lighting system. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND ART

In the context of vehicles, especially trucks, the drivers are not only driving the vehicle but also live inside and outside the vehicle. Truck drivers are spending time around the truck in dedicated truck parking areas for stops, for example for eating, resting, socializing. There is a need to make these stops more comfortable for them.

SUMMARY

This disclosure improves the situation.

According to a first aspect of the disclosure, it is proposed an exterior lighting system for a vehicle, notably a truck, comprising:

- a lighting source configured to emit a light beam, the lighting source being part of one of existing exterior lights of the vehicle,
- an object being configured to have at least one active position and a passive position, the object being configured to modify the light beam in said at least one active position and to have no effect on the light beam in said passive position,
- an actuator configured to move the object between said at least one active position and said passive position,
- a controller for controlling the actuator, the controller being configured to
  - i. deactivate the actuator when the vehicle is not parked, so as to prevent the actuator from moving the object, the object staying in said passive position, and to
  - ii. activate the actuator only when the vehicle is parked, so as to allow the actuator to move the object from the passive position to said at least one active position.

The first aspect of the disclosure may seek to make the stops more comfortable for the drivers. A technical benefit may include allowing a specific management of an ambient or comfort light to ease the exterior activities around the vehicle, especially the trucks, when the vehicle is parked.

There is no need to add a new light, as the existing exterior lights of the vehicle are used.

The object, when modifying the light beam, allows to create a desired atmosphere around the vehicle.

The exterior existing lights are submitted to specific rules when the vehicle is driven, or when the vehicle is stopped in emergency conditions. However, these rules do not apply to a parked vehicle, i.e. a vehicle that has stopped in a parking area. This is offering an opportunity to use the exterior lights in another way than their original purpose.

The following features, can be optionally implemented, separately or in combination one with the others:

Optionally in some examples, including in at least one preferred example, in said at least one active position the object may be placed on at least part of a path of the light beam and in said passive position the object may be placed away from the path of the light beam.

Optionally in some examples, including in at least one preferred example, the object may be a diffusing panel. The diffusing panel may be configured to change at least one parameter of the light beam in said at least one active position. The at least one parameter may be chosen in the group consisting of a color, an intensity, and a pattern.

A technical benefit may include the possibility of creating a diffused illumination, whereas the regulated light beam of the exterior light provides focused illumination when driving. Another technical benefit may include the possibility of creating a short distance illumination in front of the vehicle, whereas the exterior light is originally designed to illuminate at a certain distance, for example a long distance, in front of the vehicle. It is therefore possible to modify a long distance focused beam to a short distance diffused light.

The diffusing panel may comprise a material chosen in the group consisting of a paper, a textile, a glass, a polymer. Said material may be translucent or semi-transparent, i.e. allowing light, but not detailed shapes, to pass through. The diffusing panel may be colored. The diffusing panel may comprise at least one relief, such as a picot or prism.

Optionally in some examples, including in at least one preferred example, the object may be a deflector. The deflector may be configured to deflect at least part of said light beam in said at least one active position.

A technical benefit may include the possibility of creating an indirect illumination. In such case, all or part of the light beam may be deflected by the deflector. The deflector is advantageously opaque, so that no light beam crosses the deflector, i.e. the totality of the light beam that impacts the deflector is deflected. Another technical benefit may include the possibility of creating a short distance illumination in front of the vehicle, whereas the exterior light is originally designed to illuminate at a certain distance, for example a long distance, in front of the vehicle. It is therefore possible to modify a long-distance direct focused beam to a short distance indirect light.

In such a case, the exterior lighting system may comprise a reflector configured to reflect the light beam after being deflected by said deflector. Such a reflector may be part of the existing light, forming for example part of the casing.

The reflector may have a colored surface. The reflector may create a mirror effect. The reflector may have a textured surface or a surface having at least one relief, such as a picot or prism. The reflector may have an opaque surface.

The reflector may comprise a material chosen in the group consisting of a black polymer, a polymer with a mirror effect and a metal, said material forming a coating of the reflector or the reflector itself.

The object may comprise a single piece. Alternatively, the object may comprise a plurality of pieces, preferably two pieces. In such case, the pieces may be configured to be moved simultaneously or successively, and may cooperate to create the desired illumination.

Optionally in some examples, including in at least one preferred example, the actuator may be chosen in the group consisting of an electric motor moving a shaft, an electric cylinder and a worm screw. Other actuators may be implemented without departing from the scope of the disclosure.

Optionally in some examples, including in at least one preferred example, the object may have a suitable shape. The object may be either planar, concave or convex towards the lighting source.

Optionally in some examples, including in at least one preferred example, the controller may be an ECU (Engine Control Unit) of the vehicle.

The controller may be configured to control the movement generated by the actuator to move the object, when the actuator is activated.

The existing exterior light may be chosen in the group consisting of driving lamps, position lamps, direction indicator lamps and working lamps.

The existing exterior light may be of the type of direct illumination with projector or of the type of indirect illumination with reflector, preferably of the type of direct illumination with projector.

The lighting source may comprise a light-emitting diode (LED), a laser or a halogen light, or another lighting source used for vehicle exterior lights.

The existing exterior light may comprise a glass, the lighting source facing the glass. The object may be placed between the light source and the glass in the active position (s).

There may be only one active position. Alternatively, there may be several active positions, in which the object may cover more or less of the path of the light beam.

The movement made by the object between said passive position and said at least one active position may comprise at least one of a translation and a rotation, preferably a translation. This means that the movement may comprise only a translation, or only a rotation, or a combination of a translation and a rotation.

Several existing exterior lights may be equipped with such an object and an actuator. This means that the exterior lighting system may comprise several lighting sources, several corresponding objects and actuators, and that the controller may be configured to activate/deactivate each actuator, depending on the state of the vehicle, and to control the movement generated by each actuator to move each corresponding object, when the corresponding actuator is activated.

According to a second aspect of the disclosure, in combination with the first aspect, there is provided a vehicle comprising the exterior lighting system as recited above.

According to a third aspect of the disclosure, in combination with the above, a method for controlling an exterior lighting system according to the above, of a vehicle is proposed. The method comprises:

checking if the vehicle is parked, if the vehicle is parked, activating the actuator so as to allow the actuator to move the object from the passive position to said at least one active position, if the vehicle is not parked, deactivating the actuator, so as to prevent the actuator from moving the object, the object staying in said passive position.

The method may use a controller of the vehicle, the controller comprising a processor and a memory storing data and instructions configured for execution by the processor. The controller may be configured to control checking if the vehicle is parked, if the vehicle is parked, activating the actuator so as to allow the actuator to move the object from the passive position to said at least one active position and if the vehicle is not parked, deactivating the actuator, so as to prevent the actuator from moving the object, the object staying in said passive position.

The method may comprise, if the vehicle is parked, moving the object by controlling the actuator. This may be implemented by the controller.

One or several objects may be moved, in order to modify the light beams of several existing exterior lights and to create a lighting ambiance.

The objects of right and left exterior lights may be moved independently from one another.

Checking if the vehicle is parked may comprise receiving an information from at least one sensor or connected device about a state of the vehicle, i.e. if it is parked or not.

The at least one sensor or connected device may be chosen in the group consisting of a key fob, a dashboard dedicated switch, a front camera, a side camera, a front radar, a side radar, a smart phone app, a voice recognition and an exterior control panel.

According to a fourth aspect, in combination with the above, the disclosure relates to a computer system of a controller of an exterior lighting system as recited above, the computer system comprising processing circuitry configured to:

check if the vehicle is parked, if the vehicle is parked, activate the actuator so as to allow the actuator to move the object from the passive position to said at least one active position, if the vehicle is not parked, deactivate the actuator so as to prevent the actuator from moving the object, the object staying in said passive position.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

In another aspect, it is proposed a computer software comprising instructions to implement at least a part of a method as defined here when the software is executed by a processor. In another aspect, it is proposed a computer-readable non-transient recording medium on which a software is registered to implement the method as defined here when the software is executed by a processor.

BRIEF DESCRIPTION OF DRAWINGS

Other features, details and advantages will be shown in the following detailed description and on the figures, on which.

DETAILED DESCRIPTION

The detailed description set forth below provides information and examples of the disclosed technology with sufficient detail to enable those skilled in the art to practice the disclosure.

Figure 1:
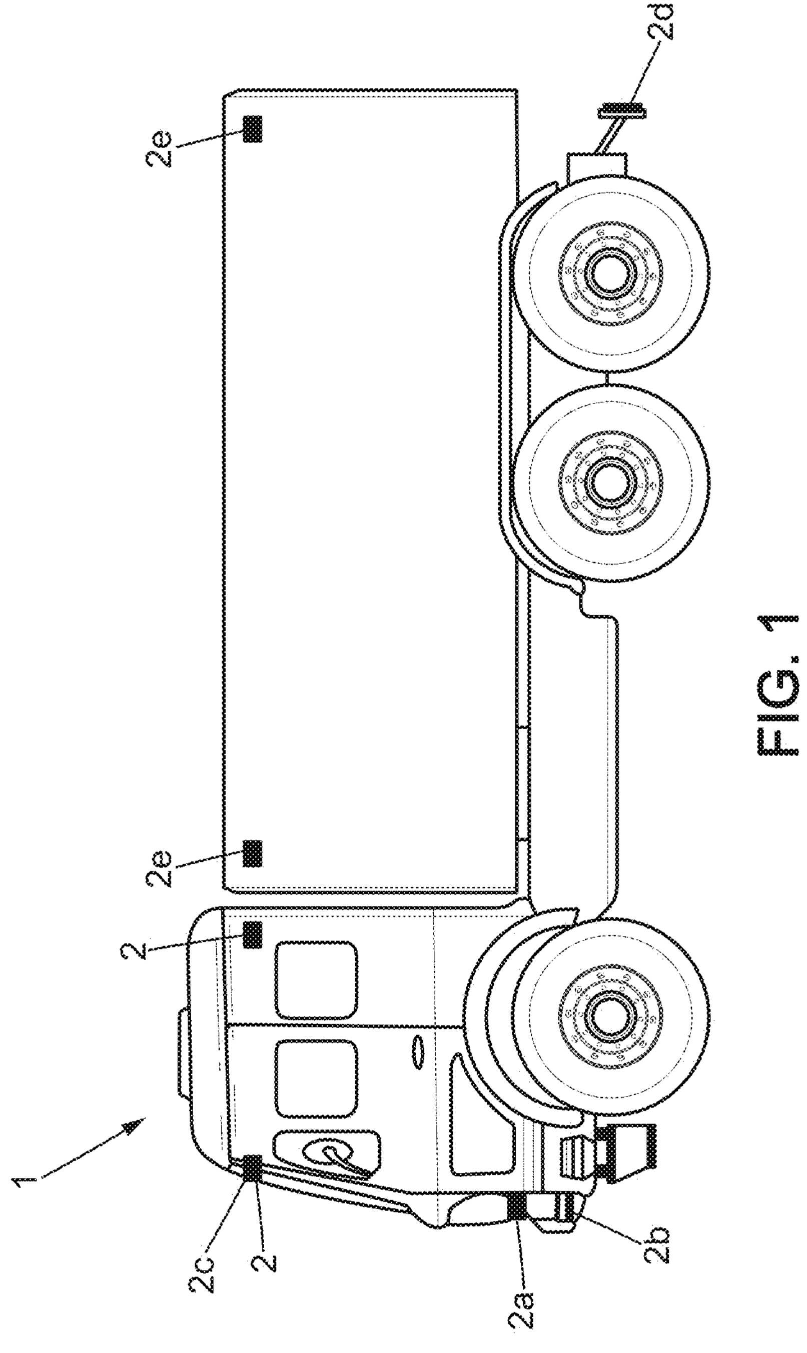
FIG. 1 is an exemplary vehicle according to an example, the vehicle being shown schematically in a side view.

It is now referred to FIG. 1. In the context of vehicles, especially trucks, the drivers are not only driving the vehicle but also live inside and outside the vehicle. Truck drivers are spending time around the truck in dedicated truck parking areas for stops, for example for eating, resting, socializing. There is a need to make these stops more comfortable for them.

FIG. 1 shows a vehicle 1 which is a truck in this example. This vehicle 1 comprises a plurality of existing exterior lights 2, in a manner known per se, a part of which is shown in FIG. 1. The existing exterior lights 2 comprise driving lamps, position lamps, direction indicator lamps. All these existing exterior lights 2 are submitted to regulation and mandatory while driving. Other possible existing exterior lights 2 may comprise working lamps being focused and installed to target a dedicated vehicle equipment usage, such as crane controls, fifth wheel, trailer connection. Such working lamps may not be submitted to regulation and are dedicated to working tasks. In FIG. 1, the existing exterior lights 2 that are shown are a front headlamp 2*a* comprising a position light, a low beam and a high beam, a front fog lamp 2*b*, an extra high beam 2*c*, a rear light 2*d* comprising a brake light, trailer lights 2*e*. It is to be noted that other light sources may be used, such as DRL for Daytime running Lamps, turn indicators and hazard lights, cornering lights in some applications.

The disclosure uses at least part of these existing exterior lights 2 to improve the comfort of the stops for the drivers and possibly other persons. According to the disclosure, as shown in FIG. 2, and FIGS. 3 to 6, it is proposed an exterior lighting system 10 for a vehicle 1, notably a truck, comprising a lighting source 20 configured to emit a light beam F, the lighting source 20 being part of one of the existing exterior lights 2 of the vehicle 1, for example as shown in FIG. 1, more generally all possible existing exterior lights 2 of the vehicle.

Figure 3:
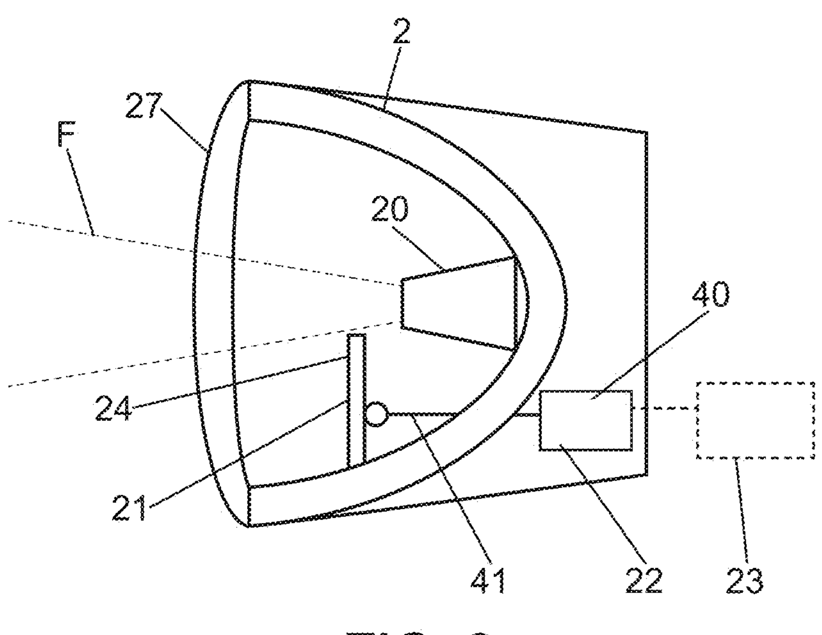
FIG. 3 is an exemplary exterior lighting system shown partially, schematically in sectional view in a passive position, according to an example.
Figure 4:
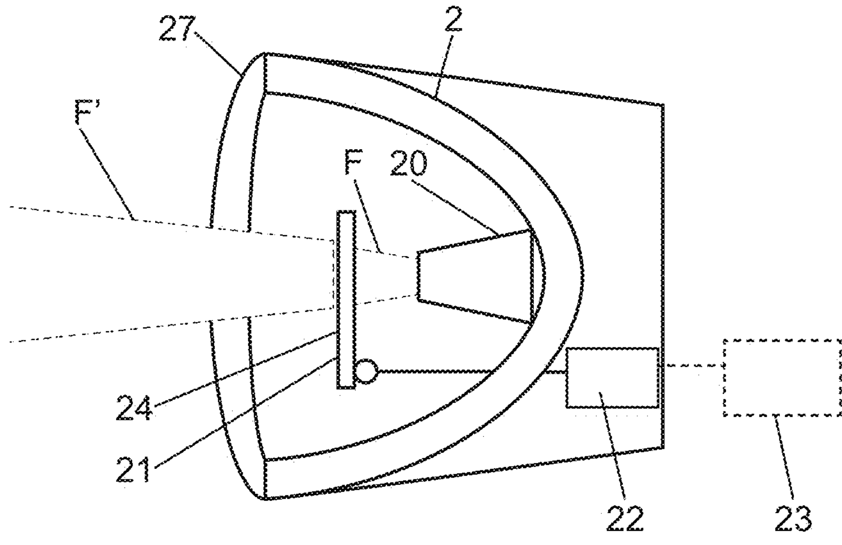
FIG. 4 is a view like the one of FIG. 3, the exterior lighting system being shown in an active position.
Figure 5:
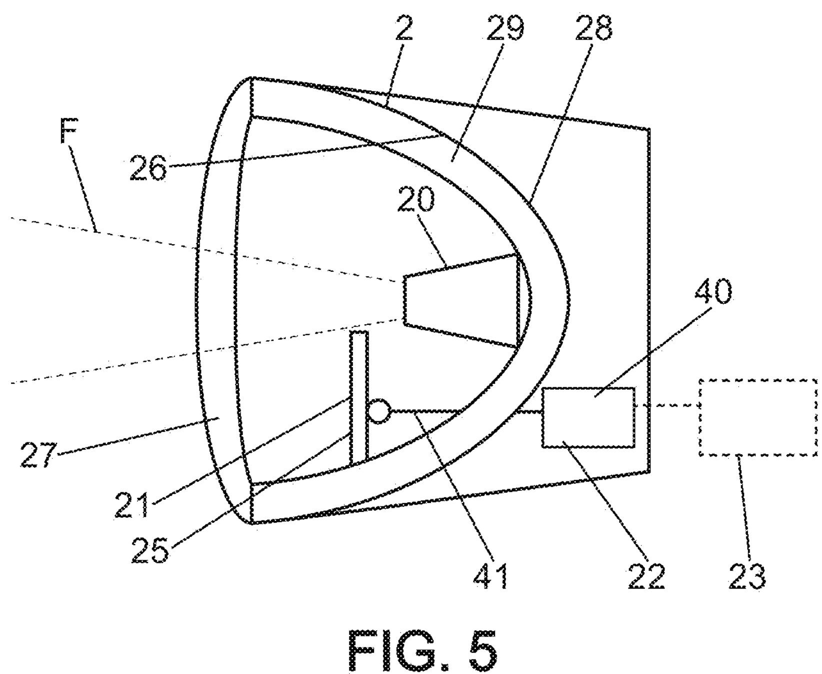
FIG. 5 is an exemplary exterior lighting system shown partially, schematically in sectional view in a passive position, according to an example.
Figure 6:
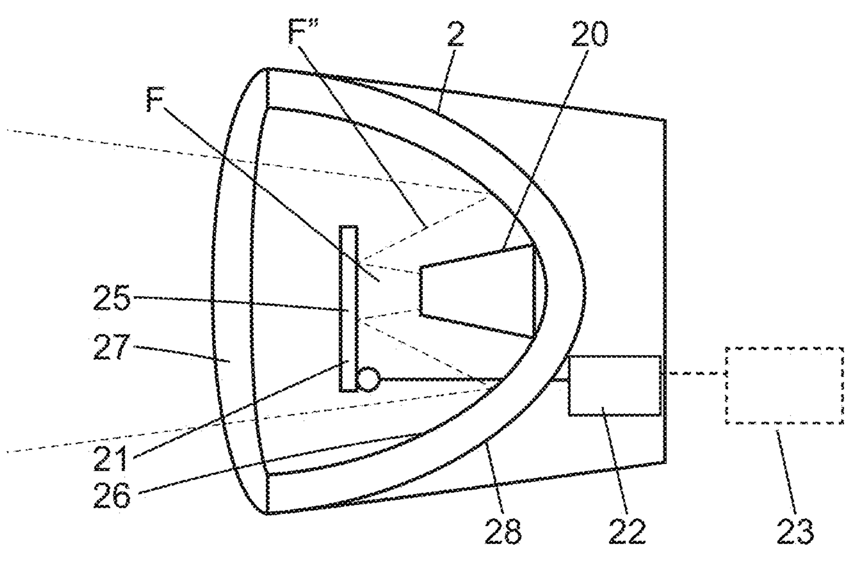
FIG. 6 is a view like the one of FIG. 5, the exterior lighting system being shown in an active position.

The exterior lighting system 10 also comprises an object 21 being configured to have at least one active position and a passive position, the object 21 being configured to modify the light beam F in said at least one active position and to have no effect on the light beam F in said passive position. A first example of object 21 is shown in FIGS. 3 and 4, a second example of object 21 is shown in FIGS. 5 and 6 as described below.

The exterior lighting system 10 also comprises an actuator 22 configured to move the object 21 between said at least one active position and said passive position, and a controller 23 for controlling the actuator 22. The controller 23 is configured to deactivate the actuator 22 when the vehicle 1 is not parked, so as to prevent the actuator 22 from moving the object 21, the object 21 staying in said passive position. The controller 23 is also configured to activate the actuator 22 only when the vehicle 1 is parked, so as to allow the actuator 22 to move the object 21 from the passive position to said at least one active position.

It is therefore possible to make a specific management of an ambient or comfort light to ease the exterior activities around the vehicle 1, especially the trucks, when the vehicle is parked. There is no need to add a new light, as the existing exterior light(s) is or are used. The object 21, when modifying the light beam F, allows to create a desired atmosphere around the vehicle 1.

The exterior existing lights 2 are submitted to specific rules when the vehicle 1 is driven, or when the vehicle 1 is stopped in emergency conditions. However, these rules do not apply to a parked vehicle, i.e. a vehicle that has stopped in a parking area.

In the examples shown in FIGS. 4 and 6, in said at least one active position the object 21 is placed on at least part of a path of the light beam F, in these examples on the entire path of the light beam F. In the examples shown in FIGS. 3 and 5, in said passive position, as shown, the object 21 is placed away from the path of the light beam F.

In the examples of FIGS. 3 to 6, the existing exterior light 2 is of the type of direct illumination with projector. In an alternative example, the existing exterior light 2 is of the type of indirect illumination with reflector. The lighting source 20 may comprise a light-emitting diode (LED), a laser or a halogen light, or another lighting source used for vehicle exterior lights.

In the examples shown in FIGS. 3 to 6, the existing exterior light 2 comprises a casing 28 and a glass 27, the lighting source 20 being within the casing 28 and facing the glass 27. The object 21 is placed between the light source 20 and the glass 27 in the active position(s) shown in FIGS. 4 and 6.

The object 21 may have a suitable shape and may be either planar, concave or convex towards the lighting source 20. In both examples of FIGS. 3 to 6, the object 21 has two opposite planar surfaces, parallel to one another.

There may be one active position, for example the one shown in FIG. 4 or in FIG. 6. Alternatively, there may be several active positions, in which the object 21 may cover more or less of the path of the light beam.

In the example shown in FIGS. 3 and 4, the object 21 is a diffusing panel 24. The diffusing panel 24 may be configured to change at least one parameter of the light beam F in said at least one active position. The at least one parameter may be chosen in the group consisting of a color, an intensity, and a pattern. This may allow to create a diffused illumination F', as shown in FIG. 4, whereas the regulated light beam of the exterior light 2 provides focused illumination when used during driving. This also may allow to create a short distance illumination in front of the vehicle 1, whereas the exterior light 2 is originally designed to illuminate at a certain distance in front of the vehicle for lighting regulated conditions when driving.

The diffusing panel 24 may comprise a material chosen among the group consisting of a paper, a textile, a glass and a polymer. Said material may be translucent. The diffusing panel 24 may be colored. The diffusing panel 24 may comprise at least one relief, such as a picot or prism.

In this example, the diffusing panel 24 is made in a single piece, made of a polymer, having a planar surface facing the lighting source 20. The diffusing panel 24 has a constant thickness.

In the example shown in FIGS. 5 and 6, the object 21 is a deflector 25. The deflector 25 may be configured to deflect at least part of the light beam F in said at least one active position. In the example shown in FIG. 6, The deflector 25 deflects all the light beam Fin a deflected light beam F". It is therefore possible to create an indirect illumination. The deflector 25 is in this example opaque, so that no light beam F crosses the deflector 25. Thus, the totality of the light beam F that impact the deflector 25 is deflected.

In this example, the deflector 25 is made in a single piece, made of a polymer, having a planar surface facing the lighting source 20. The deflector 25 has a constant thickness.

In the example of FIGS. 5 and 6, the exterior lighting system 10 also comprises a reflector 26 configured to reflect the light beam F after being deflected by the deflector 25. Such a reflector 26 is part of the existing light 2, forming in this example an interior part 29 of the casing 28.

The reflector 26 may have a colored surface. The reflector 26 may have a textured surface or a surface having at least one relief, such as a picot or prism. The reflector 26 may have an opaque surface.

The reflector 26 may comprise a material chosen in the group consisting of a black polymer, a polymer with a mirror effect and a metal, said material forming a coating of the reflector 26 or the reflector 26 itself.

In the examples of FIGS. 3 to 6, the object 21 comprises a single piece. Alternatively, the object 21 may comprise a plurality of pieces, preferably two pieces. In such case, the pieces may be configured to be moved simultaneously or successively, and may cooperate to create the desired illumination.

The actuator 22 may be chosen in the group consisting of an electric motor moving a shaft, an electric cylinder and a worm screw. Other actuators 22 may be implemented without departing from the scope of the disclosure.

In the examples of FIGS. 3 to 6, the actuator 22 comprises an electric motor 40 moving a shaft 41. The movement made by the object 21 between said passive position and said at least one active position comprises a translation in the examples shown in FIGS. 3 to 6. However, a rotation or a combination of a translation and a rotation of the object 21 when moved by the actuator 22 could be implemented.

The controller 23 may be an ECU (Engine Control Unit) of the vehicle 1. The controller 23 comprises a processor and a memory storing data and instructions configured for execution by the processor.

The controller 23 may be configured to control the movement generated by the actuator 22 to move the object 21, when the actuator 22 is activated.

Figure 7:
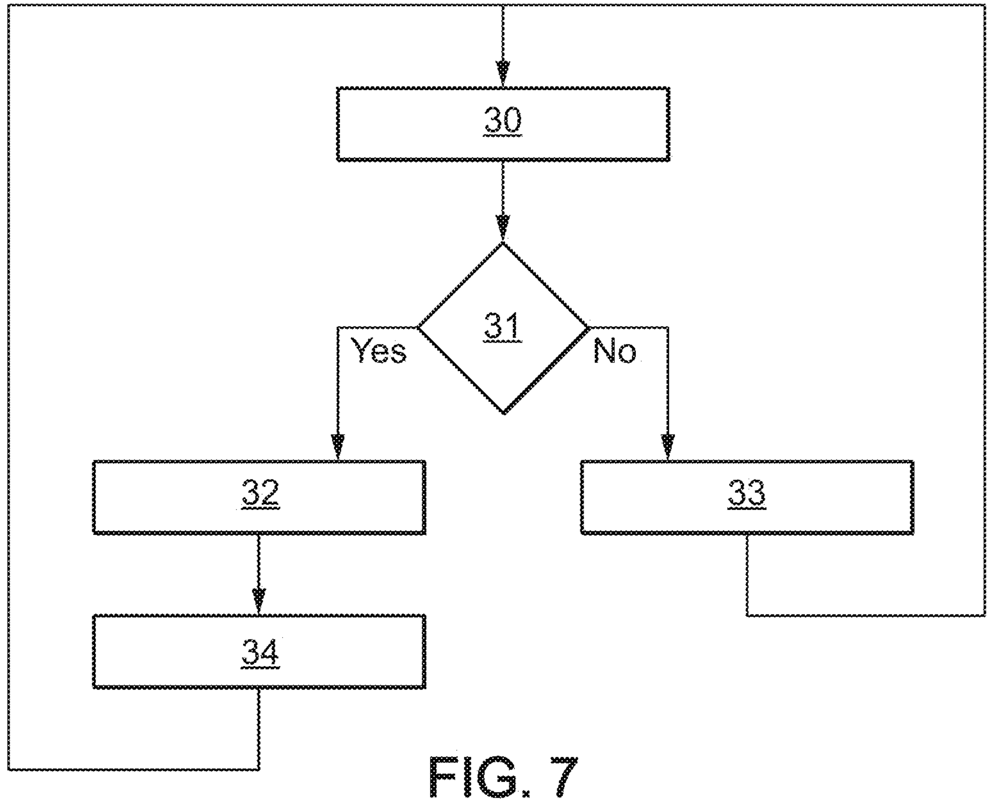
FIG. 7 shows a block diagram of a method according to an example.

FIG. 7 shows a method for controlling the exterior lighting system 10 of a vehicle 1. The method comprises, starting from an initial state 30 of the vehicle, checking 31 if the vehicle 1 is parked.

If yes, i.e. if the vehicle is parked, the method comprises activating 32 the actuator 22 so as to allow the actuator 22 to move the object 21 from the passive position to said at least one active position.

If no, i.e. if the vehicle 1 is not parked, deactivating 33 the actuator 22, so as to prevent the actuator 22 from moving the object, 21 the object 21 staying in said passive position. In this situation, the lighting source 20 may be used according to regulated lighting conditions. This method may be implemented several times, as shown.

If yes, the controller 23 may control 34 the movement generated by the actuator 22 to move the object 21, when the actuator 22 is activated. This allows to create a desired lighting ambiance, by moving the object 21 of one or more existing exterior lights 2.

Figure 8:
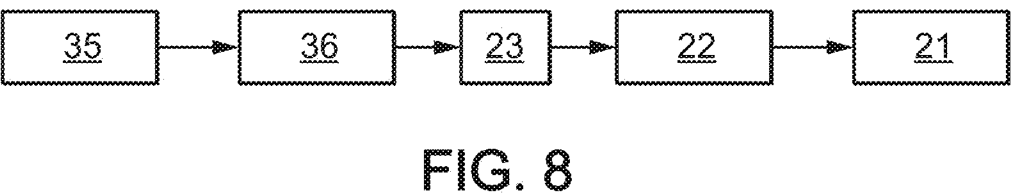
FIG. 8 is a block diagram showing implementing an exterior lighting system according to an example.

Checking 31 if the vehicle 1 is parked may comprise receiving an information 36 from at least one sensor or connected device 35, which is a transmitter, about a state of the vehicle, i.e. if it is parked or not. At least one of these sensors or connected devices 35 may send an information that may be received by the controller 23, notably by the ECU, as shown in FIG. 8. The at least one sensor or connected device 35 may for example be chosen among a switch in cab, a key fob, a smartphone, a driver's voice, an exterior control panel, a front camera, a left side camera, a right side camera, a front radar, a left side radar, a right side radar. This step is also shown in FIG. 3.

Figure 2:
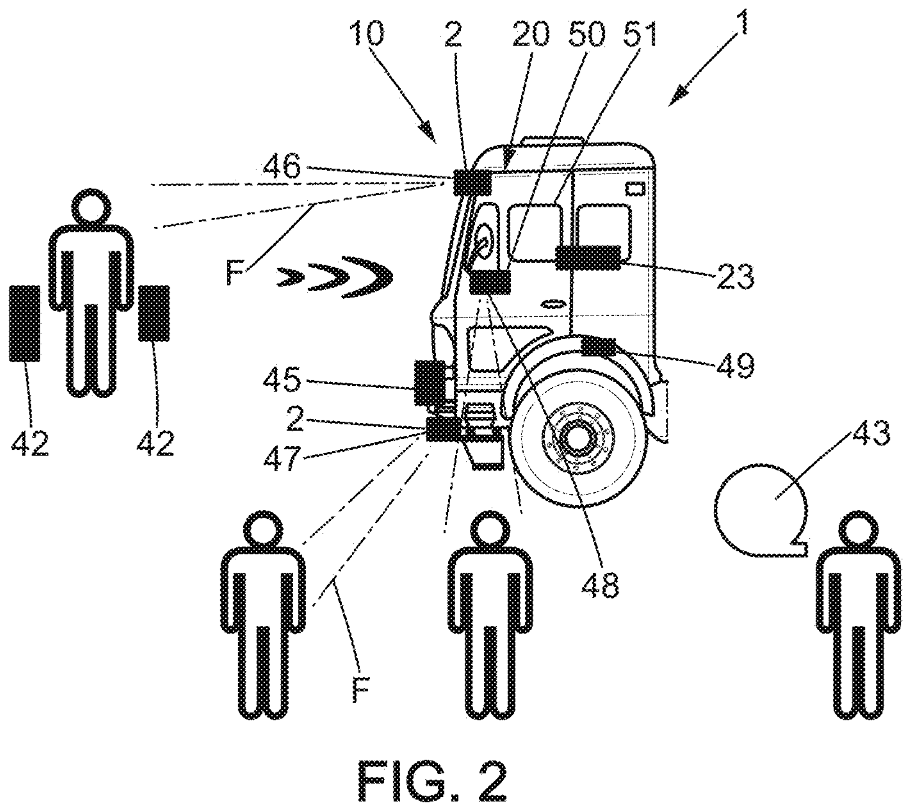
FIG. 2 is an exemplary vehicle according to an example, partially shown and with people around the vehicle showing an exemplary method according to an example.

As shown in FIG. 2, several examples of sensors or connected devices 35 are shown: a HMI control such as a switch 40 inside a cab 41 of the vehicle 1, a key fob 42, a micro 49 for recognizing a voice 43, for example the driver's voice, a smartphone 44, an exterior control panel 45, a front camera 46 used for ADAS (Advanced Driver Assistance Systems), but also a left side camera, and/or a right side camera 48, used for visibility such as CMS (Camera Managing System) or ADAS or comfort Cams (Blind spot cam), a front radar 47, a left side radar, a right side radar. Such cameras or radars may detect a driver presence around the vehicle.

Said information 36 may be transmitted to the controller 23 via adapted and conventional channels depending on the transmitter. For example, if the transmitter is a switch 40 in the cab 41, the information may be transmitted via cab controls. If the transmitter is the key fob 42, the information may be transmitted via radio frequency. If the transmitter is a smartphone 44, the information may be transmitted with an app via specific connectivity. If the transmitter is a micro 49 intercepting a voice 43, the information may be transmitted via voice recognition. If the transmitter is an exterior control panel 45, the information may be transmitted via a key switch. It the transmitter is a camera, the information may be transmitted via camera communication bus network to a camera monitoring controlled by the controller. If the transmitter is a radar, the information may be transmitted via in vehicle communication network to a radar monitoring controlled by the controller.

Said information 36 may be a trigger for the controller 23, preferably the ECU, for activating 32 the actuator 22 so as to allow the actuator 22 to move the object 21 from the passive position to said at least one active position, or, on the contrary, deactivating 33 the actuator 22, so as to prevent the actuator 22 from moving the object, 21 the object 21 staying in said passive position, depending on the state of the vehicle, i.e. if it is parked or not.

The controller 23 may comprise a user interface to exchanging data with a user, for example the driver. Controlling the actuator(s) 22 may be initiated by a user, for example a driver, using one of an HMI interface, a smartphone app, a gesture control, a voice control, a cursor. In such case, the user may, for example through such HMI interface, smartphone app, gesture control or voice control or cursor, send at least one order to the controller 23 so that the controller 23 controls the movement generated by the actuator 22, as shown in FIG. 8 so as to create a particular lighting ambiance.

The memory of the controller 23 may comprise a plurality of lighting ambiances. Each lighting ambiance comprises a particular active position of at least one object 21. The method may then comprise choosing a lighting ambiance among said plurality of lighting ambiances, each lighting ambiance comprising a predetermined movement of the object 21 or objects 21 to be generated by the corresponding actuator(s) 22.

Choosing said lighting ambiance may be implemented by the user, by adjusting a cursor configured to be adjusted so as to choose among said plurality of lighting ambiances, said cursor being for example for example on a dashboard of the vehicle, on a smartphone, on a key fob, on an exterior part of the vehicle.

The driver may for example dim or mix the light sources of the exterior lights in order to create for example a fancy exterior living environment. The exterior lights may be turned into exterior ambient and comfort lights by moving corresponding objects 21.

Alternatively, choosing a lighting ambiance may be made automatically, for example being controlled by the controller 23, as a function of a moment of the day or a brightness of external environment around the vehicle, such as dusk, night, morning. This means that when the vehicle is parked and the controller 23 has received this information, it may automatically choose and create a lighting ambiance depending on a moment of the day or a brightness of external environment.

A computer system comprising processing circuitry may be configured to implement this method. The vehicle 1 may comprise said computer system which comprises the controller 23.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. An exterior lighting system for a vehicle comprising:

a lighting source configured to emit a light beam, the lighting source being part of one of existing exterior lights of the vehicle;

an object being configured to have at least one active position and a passive position, the object being configured to modify the light beam in the at least one active position and to have no effect on the light beam in the passive position, the object being a deflector configured to deflect at least part of the light beam in the at least one active position;

a reflector configured to reflect the light beam after being deflected by the deflector;

an actuator configured to move the object between the at least one active position and the passive position; and a controller for controlling the actuator, the controller being configured to:

deactivate the actuator when the vehicle is not parked, so as to prevent the actuator from moving the object, the object staying in the passive position; and activate the actuator only when the vehicle is parked, so as to allow the actuator to move the object from the passive position to the at least one active position.

2. The exterior lighting system of claim 1, wherein in the at least one active position the object is placed on at least part of a path of the light beam and wherein in the passive position the object is placed away from the path of the light beam.

3. The exterior lighting system of claim 1, wherein the object is a diffusing panel, wherein the diffusing panel is configured to change at least one parameter of the light beam in the at least one active position, the at least one parameter being chosen in the group consisting of a color, an intensity, and a pattern.

4. The exterior lighting system of claim 1, wherein the controller is a Engine Control Unit (ECU) of the vehicle.

5. The exterior lighting system of claim 1, wherein the controller is configured to control the movement generated by the actuator to move the object, when the actuator is activated.

6. The exterior lighting system of claim 1, wherein the movement made by the object between the passive position and the at least one active position comprises at least one of a translation and a rotation.

7. A vehicle comprising the exterior lighting system of claim 1.

8. A method for controlling the exterior lighting system of claim 1, comprising:

checking if the vehicle is parked;

if the vehicle is parked, activating the actuator so as to allow the actuator to move the object from the passive position to the at least one active position; and if the vehicle is not parked, deactivating the actuator, so as to prevent the actuator from moving the object, the object staying in the passive position.

9. The method of claim 8, wherein checking if the vehicle is parked comprises receiving information from at least one sensor or connected device about a state of the vehicle.

10. The method of claim 9, wherein the at least one sensor or connected device is chosen in a group consisting of a key fob, a dashboard dedicated switch, a front camera, a side camera, a front radar, a side radar, a smart phone app, a voice recognition and an exterior control panel.

11. A computer system of a controller of the exterior lighting system of claim 1, the computer system comprising processing circuitry configured to:

check if the vehicle is parked;

if the vehicle is parked, activate the actuator so as to allow the actuator to move the object from the passive position to the at least one active position; and if the vehicle is not parked, deactivate the actuator so as to prevent the actuator from moving the object, the object staying in the passive position.

* * * * *